Figure 4:
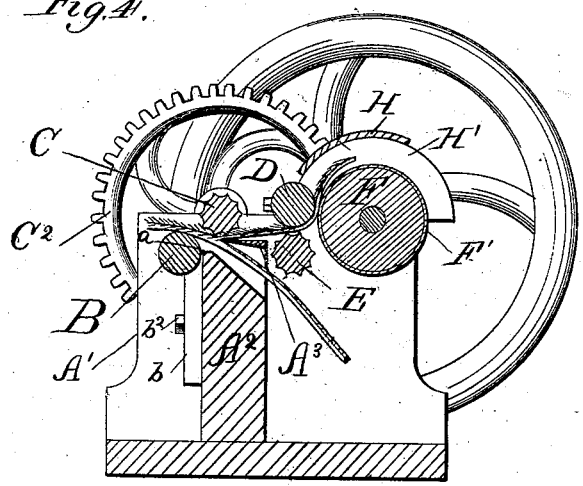

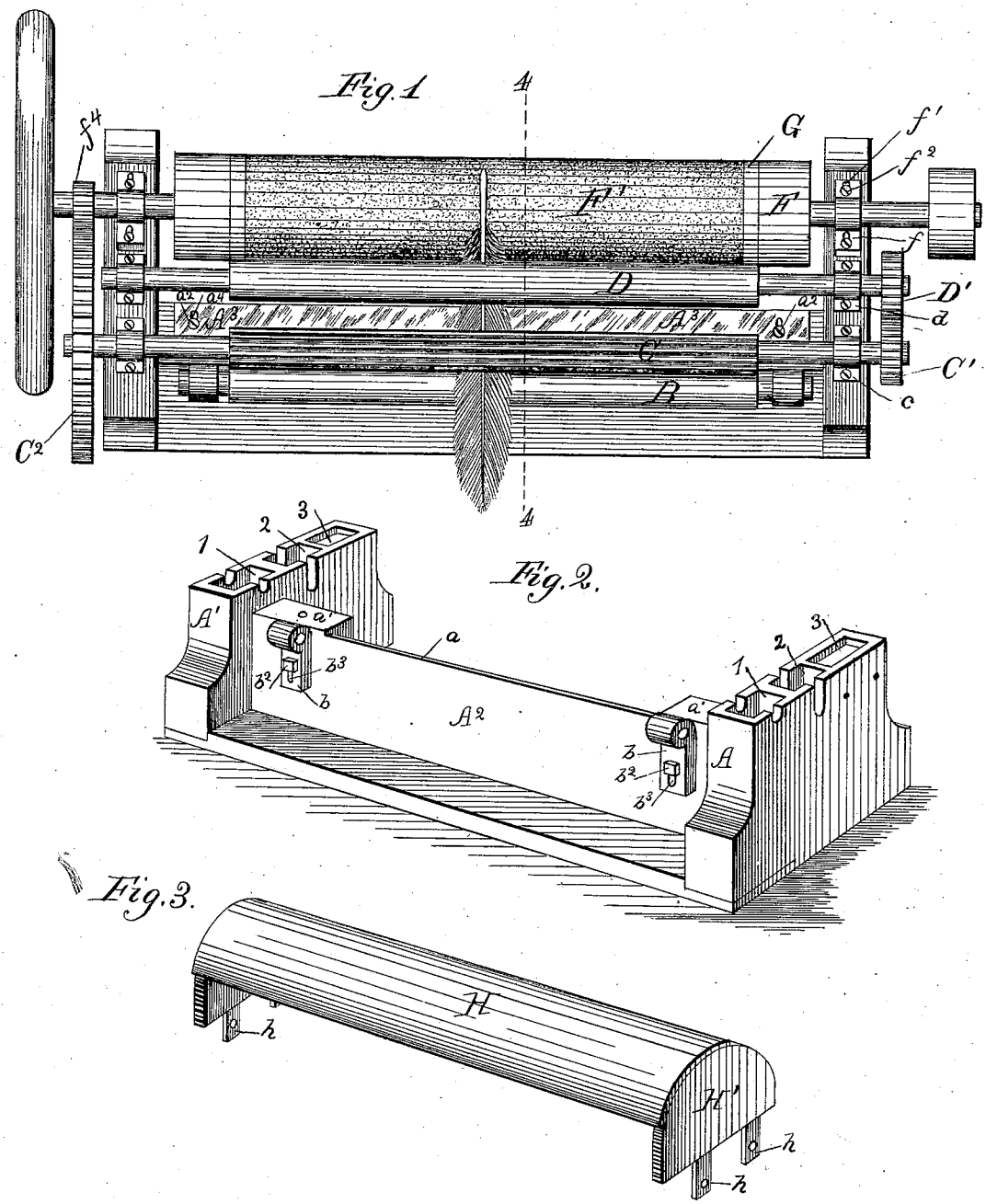

(No Model.) 2 Sheets—Sheet 2.

C. W. & E. T. NICHOLS.
METHOD OF AND MACHINE FOR PREPARING FEATHERS FOR DUSTERS, &c.

No. 264,472. Patented Sept. 19, 1882.

Witnesses:
Chas. E. Gaylord.
James H. Peirce

Inventors
Clarence W. Nichols
and Edmund T. Nichols
per
Peirce & Fisher
Attorneys.

UNITED STATES PATENT OFFICE.

CLARENCE W. NICHOLS AND EDMUND T. NICHOLS, OF CHICAGO, ILLINOIS.

METHOD OF AND MACHINE FOR PREPARING FEATHERS FOR DUSTERS, &c.

SPECIFICATION forming part of Letters Patent No. 264,472, dated September 19, 1882.

Application filed June 20, 1882. (No model.)

*To all whom it may concern:*

Be it known that we, CLARENCE W. NICHOLS and EDMUND T. NICHOLS, citizens of the United States, residing at the city of Chicago, in the county of Cook and State of Illinois, have invented certain new and useful Improvements in Methods of and Machines for Preparing Feathers for Dusters and other Purposes, of which the following is a specification.

The use to which feather dusters are commonly subjected is such that ordinary feathers in their natural state are unsuitable therefor not only on account of their harshness, but for the further reason that they are easily broken, and hence in short time render the dusters worthless. It has therefore become customary in the manufacture of feather dusters to prepare the feathers by splitting longitudinally, or otherwise removing a portion of the shafts or stems of the feathers and by scraping or cleaning from the remaining plume-bearing portion the pithy matter found adhering to the enamel wall. It is also advantageous in many instances, especially where the feathers are large and heavy, to subject the split and scraped shafts to what is known in the art as "withering," in order to increase their pliability and prevent them from breaking down.

Heretofore in machines for preparing feathers for dusters there have been employed ordinary feeding-rollers, located a distance from rotary chipping-knives or abrading-rollers, which acted to chip, or cut, or grind away in short pieces one side of the quill and that portion of the pith which adheres thereto, leaving the other side filled with pith, which was afterward removed; but in no case, so far as our knowledge of the art extends, has the quill been simultaneously flattened and split in order to substantially entirely remove the pith and a portion of the inner half, or thereabout, of the outer horny shell or body of the quill itself at one operation.

The object of our present invention is to furnish an improved method for preparing the feathers and a machine of such a character that the several operations of splitting, cleaning, and withering the shafts or stems can be rapidly and effectively accomplished, and this, too, without other manipulation of the feathers than feeding them into the machine. This object of our invention we have accomplished in the manner and by the mechanism hereinafter described, particularly claimed and illustrated in the accompanying drawings, forming part of this specification.

Figure 5:
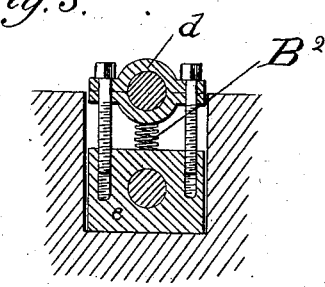
Figure 6:
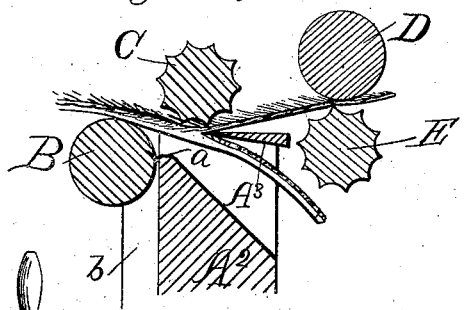
Figure 7:
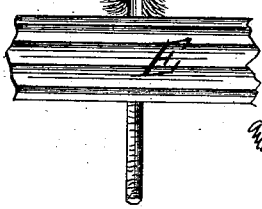

Figure 1 represents a plan view of the machine with the deflecting-plate removed. Fig. 2 is a detail perspective view of the frame of the machine. Fig. 3 is a detail perspective view of the deflecting-plate. Fig. 4 is a transverse sectional view upon lines 4 4 of Fig. 1. Fig. 5 is a detail vertical sectional view of the journal-bearings for the plain and fluted pulling-rollers. Fig. 6 is an enlarged cross-sectional view of the machine, with abrading-roller and deflecting-plate removed, and showing the position of the remaining rollers with respect to the splitting-knife. Fig. 7 is a detail back view of a portion of the fluted pulling-roller, showing the split feather in front thereof.

Like letters of reference indicate like parts in the several views of the drawings.

In the method now commonly practiced of splitting feathers for the manufacture of dusters the shaft or stem of the feather is presented to the splitting-knife in its natural approximately-round condition, and the plume-bearing portion of the split shaft, which is convex or oval, is found to contain within it considerable pithy matter, which could not be reached by the knife without cutting the plume. It was necessary therefore to scrape this convex portion of the shaft with a sharp tool or with sand-paper, in order to remove the adhering pith; and to do this effectively was most difficult, as the tool or sand-paper would not readily clean out all the pith from the concavity without risk of cutting away the enamel wall and impairing the plume. Hence more or less of this pith was apt to be left within the plume-bearing portion of the split shaft and detracted from its elasticity and pliability. We have discovered in practice that this difficulty can be overcome by presenting the plume-bearing portion of the shaft or stem in a flattened condition to the action of the splitting-knife, so that the knife shall cut close to the under surface of the enamel wall and remove substantially all the pith which would otherwise remain were such portion convex when cut. We have further found that by presenting the split shaft in a flattened condition to this abrading-surface it can be completely cleaned and polished without danger of cutting the enameled walls or injuring the plume.

We shall now proceed to describe the improved mechanism preferably employed in carrying out our method.

The frame of the machine is composed of the side plates, A and A', which are secured together, and between which is held the center plate, $A^2$. In the top of this center plate is formed the notch $a$, extending nearly the length of the plate, and upon the shoulders $a'$ of this notch is adjustably supported the splitting-knife $A^3$, held in position by means of the screws $a^2$, passing through the oblong slots $a^4$. To the front of the center plate, $A^2$, are attached the journal-bearings $b$, provided each with a slot, $b^3$, therein, which, with the screws $b^2$, effects the vertical adjustment of the bearing. If desired, strips of rubber may be placed between these journal-bearings and the center plate, $A^2$, when, by turning the set-screws, a slight adjustment to and from the center plate can be obtained. The side plates, A and A', are each furnished with a series of suitable recesses, 1, 2, and 3, which constitute seats for the journal-bearings $c$, $d$, $e$, and $f$. The journal-bearings $c$ are similar to the bearings $d$, Fig. 5, and are supported upon springs, like unto $B^2$, and are held in place and adjusted by means of suitable set-screws passing through said bearings into the side plates. The recesses 2 are made of considerable depth to receive the journal-bearings $d$ and $e$. The bearings $d$, as clearly shown in Fig. 5, are placed above the bearings $e$ upon the springs $B^2$, and the adjusting-screws which pass through the bearings enter threaded perforations in the bearings $e$ and enable the adjustment of the rollers carried by these bearings to be readily effected. The bearings $f$, as shown in Fig. 1, are made somewhat shorter than the recesses 3, and are each furnished with the oblong slots $f'$ through which pass the adjusting-screws $f^2$.

Within the bearings $b$ is journaled the guide-roller B, the upper portion of the periphery of which is approximately on a level with or slightly above the edge of the splitting-knife $A^3$, its position relative to the knife being regulated by means of the adjusting-screws $b^2$.

Beyond the guide-roller B and slightly above the edge of the splitting-knife is placed the fluted adjusting-roller C, held within the bearings $c$. Back of the knife $A^3$, in substantially the position shown, is placed the plain pulling-roller D, sustained by the adjustable bearings $d$ and the fluted pulling-roller E, which is journaled in the bearings $e$.

Within the journal-bearings $f$ is held the large abrading-roller F, of a diameter preferably four to six times greater than that of the roller D, with relation to which it is adjusted by means of the set-screws $f^2$.

A uniform motion is imparted to the several rollers through the medium of the meshing gear-wheels $C^2$ and $f^4$, attached to the ends of the journals of rollers C and F, projecting beyond the plate A' and gear-wheels D' and C', attached to the journals of the rollers C and D, projecting beyond the side plate, A.

Power is applied to the machine by means of the belt-wheel upon the journal of the abrading-roller, and a balance-wheel is preferably affixed to the opposite journal of this roller. The surface of the large abrading-roller F is covered with the sand-paper F', and beneath this sand-paper is placed the soft-rubber sheet G, the function of which will be hereinafter more fully set forth. Over the front surface of the abrading-roller is fixed the curved deflecting-plate H, which serves to guide the feathers as they pass from between the rollers D and F and cause them to fall from the machine. This deflecting plate or cover H is furnished with the perforated lugs $h$, through which pins may be passed into holes in the side plates to retain the cover in place.

Having thus concisely described the construction of our machine, a detail description of the mode of operation of the several parts will now be given.

The guide-roller B and the fluted adjusting-roller C are made adjustable for the treatment of the different sizes of feathers; but practice has demonstrated the fact that no adjustment is absolutely required except between the extremes—as, for example, when fine body-feathers and coarse wing or tail feathers are to be split. The function of the guide-roller B is to enable the feather to be directed with greater precision to the splitting-knife, and in doing this the feather is placed with the quill or butt forward and back upward on the roller B, and is pushed forward when the end of the quill, passing into a cavity of the fluted roller, strikes the edge of the splitting-knife, by which it is at once cut about its middle point. Now, as the fluted roller revolves, the ridges of the roller successively bear upon the shaft or stem of the feather and tend to flatten the same, and in this flattened condition it is exposed to the action of the splitting-knife. As the quill is thrust forward into the bite of the pulling-rollers D and E, this flattening process is continued as to the plume-bearing portion of the shaft, and the edge of the knife is caused to travel close against the under flattened surface of the upper portion of the shaft, and thus cuts away substantially all the pithy matter which, adhering to the waste portion of the shaft, falls with it below the machine.

The flattening of the plume-bearing portion of the shaft is of the greatest importance, not only because it enables substantially all the pithy matter to be removed by the knife, but for the further reason that the sand-paper of the abrading-wheel acts much more effectively on the flattened shaft without danger of injuring the plume than would be possible were the shaft not flattened.

From the above description it will be seen that the proper position of the fluted roller C, with respect to the edge of the knife, is such that when the ridges approach the same most nearly there is still left a space equal to the thickness of the horny wall of the quill, but much less than its diameter. Hence it is that however the knife may at first cut the end of the quill the fluted roller will cause said knife to cut near the top and no deeper than the distance of the roller above the knife, which will be sufficient to include that portion of the shaft which is flattened and bears the plume. By adjusting the roller C it is obvious that this distance can be varied to suit the extremely large or small feathers. Of course as the knife nears the tip of the feather the flattening of the latter is decreased gradually, since at the smaller portions of the shaft the plume lies nearer the upper surface. A firm grip is had upon the upper portion of the feather-shaft by the rollers D and E by reason of the fact that the sharp ridges of the lower fluted roller bite into the under surface of the shaft, which is somewhat rough. As the split shaft passes from between the rollers D and E it is caught by the large abrading-roller F, which bends it sharply upward, thus completing the withering or limbering action, which has been already performed in part by the fluted rollers, and presses it against the roller D. The abrading-roller F, being of much greater diameter than the roller D and traveling at a greater speed, a rasping action will be performed upon the inner surface of the flattened portion of the shaft, which will effectually clean and polish the same.

We have found in practice that by placing the rubber sheet G under the sand-paper F' a much more uniform and less violent action of the latter is obtained, since it is obvious that were the sand-paper upon an inelastic surface it would, unless constantly adjusted, act but poorly upon the thin shafts of very small feathers and cut to too great an extent the shafts of those of large size. A further and highly-important function of the soft elastic backing beneath the sand-paper is that it enables the fibers of the plume, which in ordinary feathers adhere together, to be separated, thus rendering the feathers much more effective for dusters. In order to obtain this object it is only necessary to adjust the abrading-roller nearer the roller D, so that in operation the shaft of the feather will slightly depress the sand paper until the plume is caught thereby and the fibers are separated and fluffed. The function of the curved deflecting plate or cover H is, as already stated, to direct the feathers over the back of the machine, where they may be caught in a suitable receptacle.

While we have set out in the foregoing description what we believe to be the most effective form of mechanism, it is obvious that extensive modifications of the same may be made without departing from the spirit of our invention. Thus, for example, the surface of the guide-roller B may be covered with sharp pins, so as to prick the under or softer surface of the shaft, thus feeding the same into the bite of the pulling-rollers, and serving at the same time to prevent any turning or lateral displacement of the feather.

It is also obvious that the splitting of the feathers could be accomplished were a plain roller substituted for the fluted adjusting-roller above described; but, for the reason already fully stated, the latter construction is by far the preferable one.

Instead of making the fluted roller C adjustable toward the knife, the knife may be made vertically adjustable.

It is furthermore apparent that the parts of the machine may with advantage be separately employed either alone or in connection with other machines, and we have therefore more particularly indicated our invention in the following claims:

We claim—

1. The method of preparing feathers which consists in flattening the plume-bearing portion of the feather-shaft and then longitudinally splitting said shaft, substantially as described.

2. The method of preparing feathers which consists in flattening the plume-bearing portion of the feather-shaft, simultaneously longitudinally splitting the shaft close under the flattened portion, and, finally, subjecting said flattened portion to the action of an abrading-surface, substantially as described.

3. In a machine for splitting the shafts of feathers, the combination, with the fixed splitting-knife, of a roller located above and parallel with the edge of said knife for adjusting the depth of cut, substantially as described.

4. In a machine for splitting the shafts of feathers, the combination, with the splitting-knife, of the fluted roller located above said knife, substantially as described.

5. In a machine for splitting the shafts of feathers, the combination, with the fixed splitting-knife, of the adjustable guide-roller located in front of and parallel with the edge of said knife, substantially as described.

6. In a machine for splitting the shafts of feathers, the combination of the knife A³, the guide-roller B, and adjusting-roller C, substantially as described.

7. In a machine for splitting the shafts of feathers, the combination, with the fixed splitting-knife, of a roll located in front of and parallel with the edge of said knife to adjust the degree of cut, and of the pulling-rolls behind said knife, by which the feather is drawn, substantially as described.

8. In a machine for splitting the shafts of feathers, the combination, with the splitting-knife, of the pulling-rollers, one of which is fluted, substantially as described.

9. In a machine for preparing feathers for dusters, the combination of the pulling-rollers D and E and the abrading-roller F, said abrading-roller being arranged to bear against the roller D, substantially as described.

10. In a machine for preparing feathers for dusters, the combination, with the pulling-rollers D and E, one of which is fluted, of the abrading-roller F, the slotted journal-bearings $f$, and the set-screws $f^2$, substantially as described.

11. In a machine for preparing feathers for dusters, the combination, with the roller D, of the roller F, having a soft-rubber covering and a superposed covering of sand-paper, substantially as described.

12. In machines for preparing feathers, the combination, with the pulling-rolls D and E, of the abrading-roll F, and the deflecting-plate H, substantially as described.

13. In a machine for preparing feathers for dusters, the combination of the guide-roller B, the fluted roller C, the knife $A^3$, the pulling-rollers D and E, and abrading-roller F, all substantially as described.

CLARENCE W. NICHOLS.
EDMUND T. NICHOLS.

Witnesses:
JAMES H. PEIRCE,
GEORGE P. FISHER, Jr.